(12) United States Patent  (10) Patent No.: US 7,499,981 B2
Harrow et al.  (45) Date of Patent: Mar. 3, 2009

(54) METHODS AND APPARATUS FOR PEER-TO-PEER SERVICES

(75) Inventors: Ivan P. Harrow, Navan (IE); David O. Fleming, Killarney (IE); Dermot E. Honan, Leixlip (IE); Alexander J. Leckey, Lucan (IE)

(73) Assignee: Intel Corporation, Santa Clara, CA (US)

( * ) Notice: Subject to any disclaimer, the term of this patent is extended or adjusted under 35 U.S.C. 154(b) by 1071 days.

(21) Appl. No.: 10/303,212

(22) Filed: Nov. 25, 2002

(65) Prior Publication Data

US 2003/0074403 A1   Apr. 17, 2003

Related U.S. Application Data

(63) Continuation-in-part of application No. 10/095,320, filed on Mar. 8, 2002, now Pat. No. 7,440,994.

(60) Provisional application No. 60/303,706, filed on Jul. 6, 2001.

(51) Int. Cl.
*G06F 15/16* (2006.01)
(52) U.S. Cl. .................... 709/217; 709/203; 709/216; 709/226; 709/231
(58) Field of Classification Search ............. 709/203, 709/217, 219, 236, 216, 226, 231
See application file for complete search history.

(56) References Cited

U.S. PATENT DOCUMENTS

| | | | |
|---|---|---|---|
| 5,287,500 A | 2/1994 | Stoppani, Jr. | 711/211 |
| 5,367,698 A | 11/1994 | Webber et al. | 709/203 |
| 5,592,626 A | 1/1997 | Papadimitriou et al. | 395/200.09 |
| 5,828,838 A | 10/1998 | Downs et al. | 395/200.34 |
| 5,864,854 A * | 1/1999 | Boyle | 707/10 |
| 5,884,031 A * | 3/1999 | Ice | 709/203 |

(Continued)

FOREIGN PATENT DOCUMENTS

EP    926608 A2    6/1999

(Continued)

OTHER PUBLICATIONS

Loshin, P. *What's old is new*. Boardwatch, vol. 15, issue 1, Jan. 2001. pp. 38-41.

(Continued)

*Primary Examiner*—Phuoc H Nguyen
(74) *Attorney, Agent, or Firm*—Hanley, Flight & Zimmerman, LLC

(57) ABSTRACT

Methods and apparatus for peer-to-peer services are disclosed. The apparatus and methods may include presenting at the client a link pointing to a file that resides at a first location represented by the link, receiving an indication that the link has been selected and receiving a representation of the first location. The methods and apparatus may also include determining if a second location stores a copy of the file stored at the first location, receiving a representation of the second location if the copy is stored in the second location, in response to receiving the representation of the second location, requesting download of the copy from the second location and if the copy is not stored in the second location, requesting download of the file from the first location.

48 Claims, 14 Drawing Sheets

U.S. PATENT DOCUMENTS

| | | | | |
|---|---|---|---|---|
| 6,070,191 | A | * | 5/2000 | Narendran et al. ........... 709/226 |
| 6,098,091 | A | | 8/2000 | Kisor .......................... 709/202 |
| 6,260,069 | B1 | | 7/2001 | Anglin ........................ 709/229 |
| 6,366,907 | B1 | | 4/2002 | Fanning et al. .................. 707/3 |
| 6,374,289 | B2 | * | 4/2002 | Delaney et al. ............. 709/238 |
| 6,463,471 | B1 | | 10/2002 | Dreke et al. ................. 709/224 |
| 6,519,636 | B2 | | 2/2003 | Engel et al. ................. 709/223 |
| 6,574,716 | B2 | | 6/2003 | Dovi .......................... 711/147 |
| 6,606,643 | B1 | | 8/2003 | Emens et al. ............... 709/203 |
| 6,618,752 | B1 | * | 9/2003 | Moore et al. ................. 709/217 |
| 6,647,412 | B1 | | 11/2003 | Strandberg et al. .......... 709/223 |
| 6,675,177 | B1 | | 1/2004 | Webb .......................... 707/200 |
| 6,735,623 | B1 | | 5/2004 | Prust .......................... 709/219 |
| 2002/0138744 | A1 | | 9/2002 | Schleicher et al. .......... 713/187 |
| 2002/0165979 | A1 | | 11/2002 | Vincent ...................... 709/239 |

FOREIGN PATENT DOCUMENTS

| | | |
|---|---|---|
| EP | 0993163 | 4/2000 |
| JP | 11328050 | 11/1999 |
| WO | WO 00/77606 | 12/2000 |
| WO | WO 01/04756 | 1/2001 |
| WO | WO 01/06368 | 1/2001 |
| WO | WO 01/39470 | 5/2001 |
| WO | WO 01/52198 | 7/2001 |

OTHER PUBLICATIONS

Gartner Consulting. *The Emergence of Distributed Content Management and Peer-to-Peer Content Networks*. Gartner Group, Jan. 2001. pp. 1-20.

Lewis, P. *Napster Rocks the Web*. The New York Times on the Web, Jun. 29, 2000 [retrieved on Mar. 8, 2004]. Retrieved from the internet <URL: http://archive.nytimes.com/library/tech/00/06/circuits/articles/29pete.html>. pp. 1-3.

Mojo Nation: "Technology Overview of Mojo Nation" Internet Citation, Feb. 14, 2000, 5 pages XP002177454.

Kangasharju J et al: "Locating Copies of Objects Using the Domain Name System" Proceedings of the International Caching Workshop, XX, XX, 1999, pp. 1-12, XP002197618.

LMAX: "FXP Tutorial source: The Ultimate board" Internet Citation:, 'Online! Mar. 1, 2000 XP002232596, 4 pages Retrieved from internet: <URL: http://www.flexfxp.com/forums/fxptutorial.html>, retrieved on Feb. 25, 2003.

Stirling A: "Mobile Multimedia Platforms" VTC 2000-Fall. IEEE VTS 52nd. Vehicular Technology Conference, Boston, MA, Sep. 24-28, 2000, IEEE Vehicular Technology Conferences, New York, NY: IEEE, US, vol. 6 of 6. Conf. 52, Sep. 24, 2000, pp. 2541-2548, XP001033003 ISBN: 0-7803-6508-9.

Brisco T: "RFC 1794—DNS Support for Load Balancing" Request for Comments, 7 pages Apr. 1995, XP-002209416.

Postel J et al: "RFC 959—FTP-File Transfer Protocol" Request for Comments, 17 pages Oct. 1, 1985, XP-002144723.

International Search Report, PCT/US02/21020; 4 pages; Mar. 11, 2003.

International Search Report, PCT/US02/21018; 4 pages; Mar. 17, 2003.

International Search Report, PCT/US02/21205; 4 pages; Mar. 11, 2003.

* cited by examiner

METHODS AND APPARATUS FOR PEER-TO-PEER SERVICES

RELATED APPLICATION

The present patent is a continuation-in-part of U.S. patent application Ser. No. 10/095,320, filed Jul. Mar. 8, 2002 now U.S. Pat. No. 7,440,994, entitled "Method and Apparatus for Peer-to-Peer Services," which is hereby incorporated herein by reference and which claims the benefit of U.S. Provisional Patent Application Serial No. 60/303,706 Jul. 6, 2001.

TECHNICAL FIELD

The present disclosure pertains to networks and, more particularly, to methods and apparatus for peer-to-peer services.

BACKGROUND

Many companies are adopting the use of networks for sharing information. The Internet and Intranets are examples of such networks. This information may be shared within a company, university, local group, or to users around the world, etc.

As the information shared becomes richer in content, such as streaming video, etc., it may place more demands on servers, which may lower available bandwidth, and slow down access to the information on, for example, a Wide Area Network (WAN), etc. One approach to improving performance is to "widen the pipe" or bandwidth that the WAN may handle. This may be a very expensive approach particularly where peak or spikes in traffic may be a limiting factor. This may present a problem.

BRIEF DESCRIPTION OF THE DRAWINGS

The following disclosure is provided by way of example and not limitation in the figures of the accompanying drawings, in which like references indicate similar elements and in which.

DETAILED DESCRIPTION

A method and apparatus for peer-to-peer services are described.

The disclosed system, by providing a capability whereby network traffic may be shifted to another network, may allow more efficient transfer of information, data, etc. One such example of shifting network traffic may be shifting WAN traffic to local area network (LAN) peer-to-peer traffic.

Both a WAN such as the Internet and a WAN such as a corporate Intranet may find this traffic shifting capability to be useful. To better illustrate the disclosed system, references will be made to an Intranet, however, one of ordinary skill in the art will recognize that the disclosed system may be practiced on other networks, such as the Internet.

Intranets and particularly large corporate Intranets are host to, and are sharing and transferring, much more information than in the past. The advent of streaming video is an example of content which may require more instantaneous bandwidth than the network was designed to accommodate. Shifting WAN traffic to a LAN communication may free up WAN bandwidth. If a server based content is able to be placed on a client on a LAN, then another client on the LAN may be able to access the information through peer-to-peer client interaction. This shifting of WAN server based content to a LAN client for peer-to-peer transfer allows for file sharing.

Figure 1:
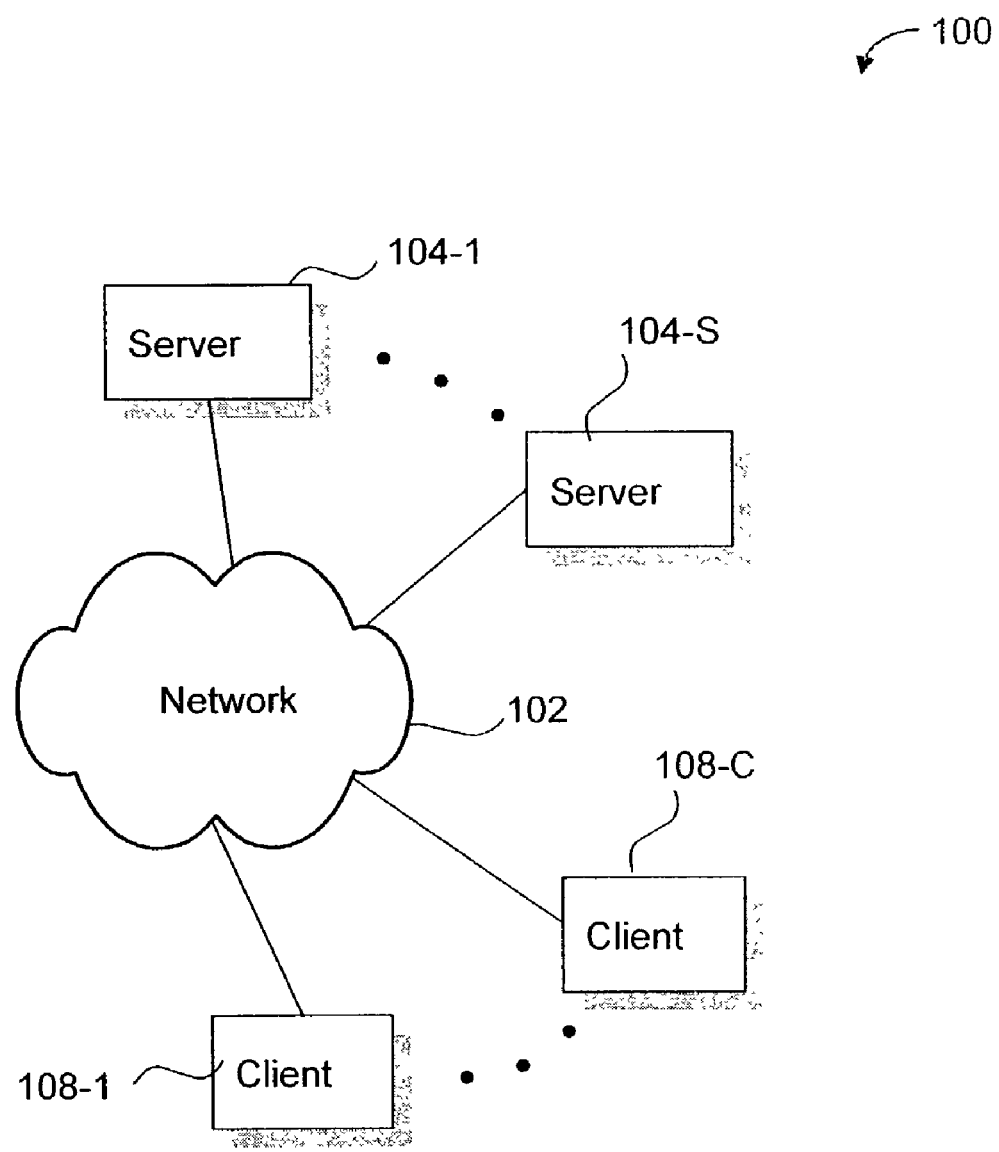
FIG. 1 illustrates a network environment in which the method and apparatus of the disclosed system may be implemented.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
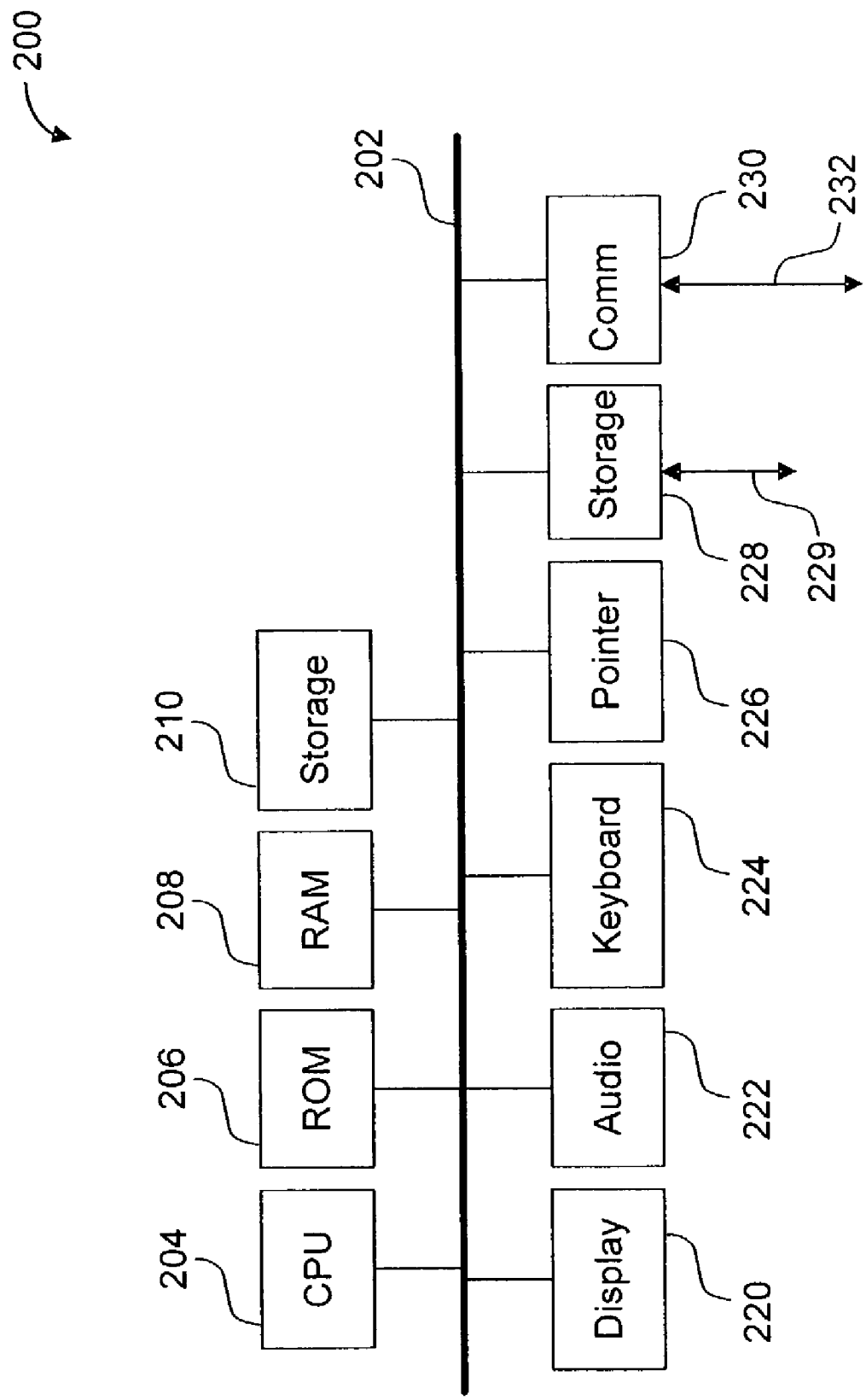
FIG. 2 is a block diagram of a computer system.

FIG. 2 illustrates a computer system 200 in block diagram form, which may be representative of any of the clients and/or servers shown in FIG. 1. More details are described below.

Figure 3:
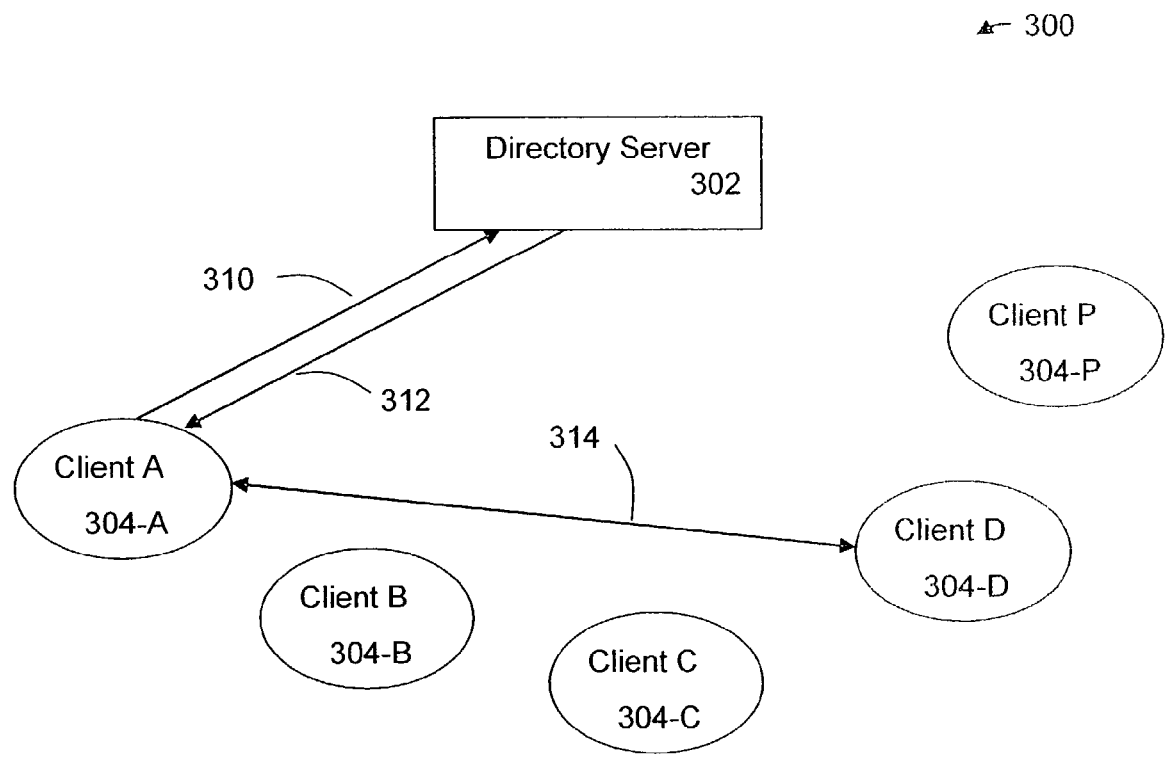
FIG. 3 illustrates one embodiment of the disclosed system being used for file sharing.

FIG. 3 illustrates one embodiment of the disclosed system 300 being used for file sharing. Directory Server 302 maintains a directory of where files are located. Client A 304-A makes a file request 310 to directory server 302. Directory server 302 looks to see where the file is located by referencing a prioritized list of closest clients with the latest revision of the file. The directory server 302 communicates the location of the file 312 to Client A. In this illustration that communication 312 conveys to Client A 304-A that Client D 304-D has a copy of the file. Client A 304-A then communicates 314 with Client D 304-D and gets the file located on Client D 304-D. The communication 314 between Client A 304-A and Client D 304-D is a peer-to-peer communication.

Thus, rather than Client A 304-A having to retrieve the file from a server possibly located on a WAN, the directory server 302 has communicated to Client A 304-A that the file may be retrieved from another Client D 304-D. Thus, traffic that may have originally had to occur on a WAN has been shifted to a peer-to-peer transfer, possibly on a LAN.

Note that since directory server 302 maintains a list of files and locations, after Client A 304-A has a copy of the file, directory server 302 will have this information also. Now, for example, if Client B 304-B requests from directory server 302 a copy of the file, the directory server 302 would know that Client A 304-A and Client D 304-D both have copies. Directory server 302 may then inform Client B 304-B that Client A 304-A is the nearest client that has a copy. Client B 304-B may then effect a peer-to-peer transfer with Client A 304-A.

After this transfer, directory sever 302 would then know that Clients A 304-A, Client B 304-B, and Client D 304-D have a copy of the file.

One of ordinary skill in the art will appreciate that the file sharing approach may "propagate" files across networks. This propagation will allow directory server 302 to communicate to any requesting client the closest client having a file for a transfer. When the clients are located on the same local network then a LAN peer-to-peer transfer will be possible. LAN transfers are generally faster than WAN to LAN transfers because of fewer intervening routers, switches, proxies, firewalls, etc.

If there is no local client that has the file requested, then the directory server 302 may direct the client to get the file from a client on a WAN and/or a file server. For example, Client D 304-D may have originally placed a file request with the directory server 302 and been informed that there was no copy of the file on a local client. Client D 304-D may have had to obtain a copy of the file, for example, over the Internet from some remote server. Once Client D 304-D has a copy of the file, directory server 302 knows this and so as explained above, if Client A 304-A then requests the file, directory server 302 can inform Client A 304-A that Client D 304-D has a copy.

As discussed above, the capability for shifting of WAN server based content to a LAN client for peer-to-peer transfer allows for file sharing. One of ordinary skill in the art will appreciate that by practicing the disclosed system in such an environment, a client based proxy service used to redirect data transfers from the network in a peer-to-peer environment may be achieved. That is, by redirecting, for example, Internet web requests to a more local network copy of the file, a web proxy service may be effected with the disclosed system.

Figure 4:
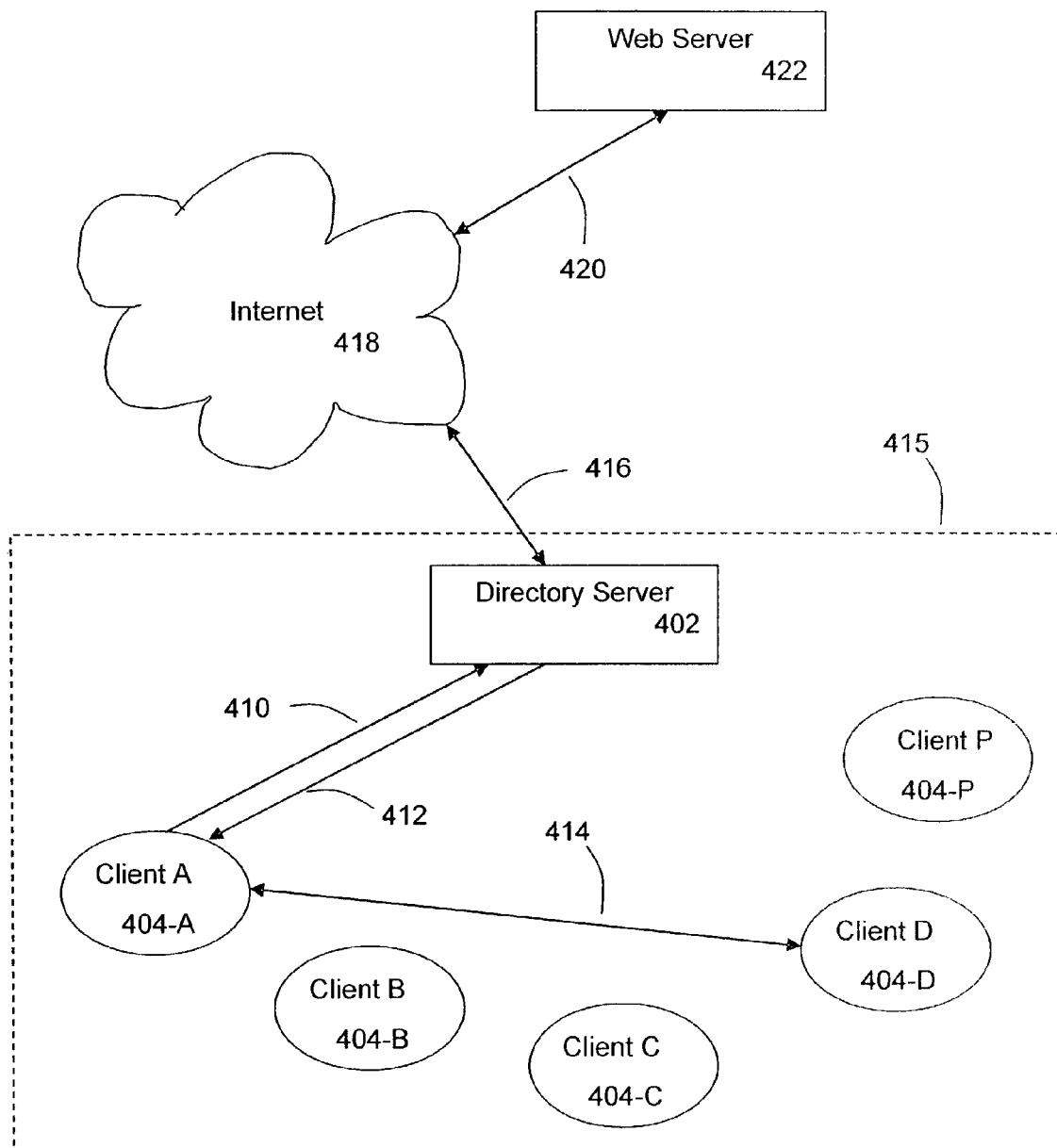
FIG. 4 illustrates one embodiment of the disclosed system being used as a web proxy service.

FIG. 4 illustrates one embodiment of the disclosed system 400 being used as a web proxy service. Directory Server 402 maintains a directory of where web files are located on a local network 415. Client A 404-A makes a file request 410 (via, for example, surfing the web) to directory server 402. Directory server 402 looks to see where the file may be located on the local network 415 by referencing a prioritized list of closest clients with the latest version of the file. The directory server 402 communicates 412 the location of the file to Client A 404-A. In this illustration that communication 412 conveys to Client A 404-A that Client D 404-D has a copy of the file and redirects Client A 404-A to get the file located on Client D 404-D. The communication 414 between Client A 404-A and Client D 404-D is a peer-to-peer communication.

Thus, rather than Client A 404-A having to retrieve the file from a web server 422 connected via 420 to the Internet 418, and via connection 416 to the directory server 402, Client A 404-A has retrieved the file from Client D 404-D. Thus, possible Internet traffic has been redirected resulting in a peer-to-peer transfer, possibly on a LAN. Thus, "local" storage of the file, plus the redirection allowing access to the local copy of the file, serves the function of a proxy.

Note that since directory server 402 maintains a list of files and locations, after Client A 404-A has a copy of the file, directory server 402 will have this information also. Now, for example, if Client B 404-B requests the same file while, for example, web browsing, the directory server 402 would know that Client A 404-A and Client D 404-D both have copies. Directory server 402 may then inform Client B 404-B that Client A 404-A is the nearest client that has a copy. Client B 304-B may then affect a peer-to-peer transfer with Client A 404-A. After this transfer, directory sever 402 would then know that Clients A 404-A, Client B 404-B, and Client D 404-D have a copy of the file.

One of ordinary skill in the art will appreciate that this file sharing approach may "propagate" web files across networks. Websites have information that changes on a regular basis. As was detailed previously, the directory server 402 maintains where the latest files are located. Thus, for example, assume it is time X, in FIG. 4, where Client A 404-A has retrieved a copy of the file from Client D 404-D. Assume next that at time X+10 minutes, Client B 404-B requests the same file. If directory server 402 is aware of a more recent copy of the file, it will direct Client B 404-B to retrieve the file from that location. This will also be the situation, where, for example, Client A 404-A has a local copy of the file at time X, but at time X+10 minutes requests the file again. If the most recent copy is on Client A 404-A then the directory server 402 will direct Client A 404-A to Client A 404-A. If the most recent copy is on another client, say for example, Client C 404-C, then the directory server 402 will direct Client A 404-A to Client 404-C for the copy. The directory server 402 will direct Client A 404-A to the web for a copy if there is no copy available on the local network 415. If the most recent copy is on the web, then the directory server 402 may direct Client A 404-A to the web for a copy.

The directory server 402 may also have an expiration timeout feature. That is, after say 10 minutes, the directory server 402 may direct a client to retrieve a copy of the file from the web server 422. In this way web content on a local network would be updated after being on the local network for more than 10 minutes. This timeout feature may be tailored to the web content. For example, a website dealing with word definitions may not need to be updated as frequently as a website having current news events.

As discussed above, the capability for shifting of WAN server based content to a LAN client for peer-to-peer transfer allows for file sharing. The clients discussed above were assumed, for convenience of discussion, to be connected to the network for most of the time. This may not be the case. For example, portable computers, PDAs, etc. may be connected and disconnected as needed. One example may be a sales office, where the outside sales people only connect to the network when they are in the office. Portable computers may not be connected to the network long enough to download a large file, such as a video presentation. This may be due to a time constraint or a bandwidth constraint. However, if the user of the portable computer could affect a LAN peer-to-peer transfer of the information, the bandwidth may be higher than from, for example, a server on the WAN. By allowing the user of the portable to select what information needs to be downloaded and having that information directed to a nearby client on the LAN, then the next time the user connects to the network, a LAN peer-to-peer transfer may be possible. Thus, the portable computer user, in effect, is a third party controlling the WAN to LAN transfer.

Figure 5:
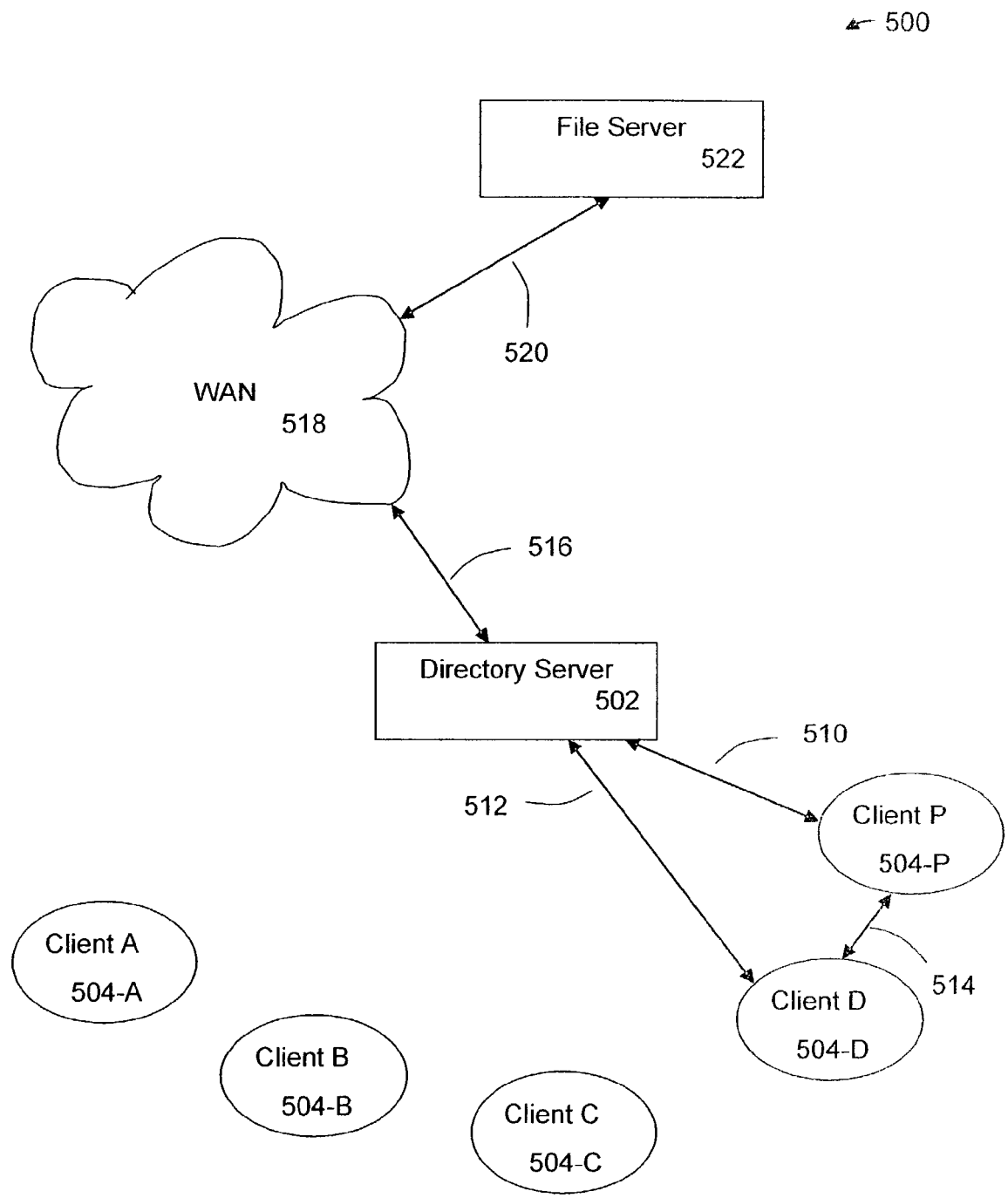
FIG. 5 illustrates one embodiment of the disclosed system where a third party is controlling the content transfer between clients across a WAN/LAN.

FIG. 5 illustrates one embodiment of the disclosed system 500 where a third party is controlling the WAN to LAN transfer. Here, Client P 504-P represents a portable client such as a portable computer or PDA. Client P 504-P may need a file from File Server 522. A request 510 to directory server 502 may indicate that there is no local copy on Client A, B, C, D, or P (504-A through P, respectively). At this point Client P 504-P may decide to either stay online and download the file or direct that it be downloaded to the nearest client. If the latter choice is selected, then the directory server 502 may determine that Client D 504-D is the nearest client and direct that the download of the file from File server 522 be directed to Client D 504-D. This transfer (via 522, 520, 518, 502, 512) may occur with Client P 504-P either presently connected to the network or disconnected. When the file has been downloaded to Client D 504-D, the directory server 502 has this information stored, and so when Client P 504-P again connects to the network and requests the file, a local peer-to-peer transfer 514 from Client D 504-D to Client P 504-P is possible. In another embodiment, the local peer-to-peer transfer 514 from Client D 504-D to Client P 504-P may be initiated automatically when Client P 504-P is connected to the network and Client D 504-D has the file locally. Again, once Client P 504-P has transferred the file, directory server 502 is aware that Client D 504-D and now Client P 504-P both have copies of the file. The device referred to in this section as the File Server 522 may also be another device, such as, a client on a remote network, etc.

In another embodiment, when Client P 504-P is connected to the network, directory server 502 may query Client P 504-P to see if Client P 504-P has selected files to be downloaded while offline. This download list may have previously been retrieved from a directory file server (either 502 and/or other directory file servers).

In another embodiment, when Client P 504-P is connected to the network, files resident on Client P 504-P may be communicated to a directory server, such as directory server 502. If new files, or files modified having a more recent date are communicated to directory server 502, then other clients will now have access to these files. Thus, for example, a portable computer used by a salesperson may be used to detail customer visit information while the salesperson is at the customer. Upon returning to the sales office and plugging into the network, the Client P 504-P may send to the directory server 502 information regarding files on Client P 504-P. These updated files would then be available via directory server 502 knowing they were on Client P 504-P.

In another embodiment, when Client P 504-P returns with updated files, the directory server 502 and/or the Client P 504-P may direct that a local copy of the updated files be made on a non-portable computer. In this embodiment then, the third party control may effect a transfer of files so that when the portable client is disconnected from the network a local copy is available to the rest of the network. The directory server 502 and/or the Client P 504-P may also direct that a copy of the updated files be sent to a central and/or web server. Thus, third party control of transfers is to and from any source and/or destination. The ability for a portable client, such as Client P 504-P to send files to another client serves as a backup of those files.

New and updated files are not limited to a portable client, such as Client P 504-P. Other clients, such as desktop clients, with new files or updated files may also use the techniques discussed above. Thus, in one embodiment of the disclosed system clients may use the network services for distributed backup and storage. Clients are not the only source of content and In yet another embodiment, files from all sources, clients, servers, etc., may make use of the disclosed system to effect shifting of content for distributed backup and storage.

Figure 6:
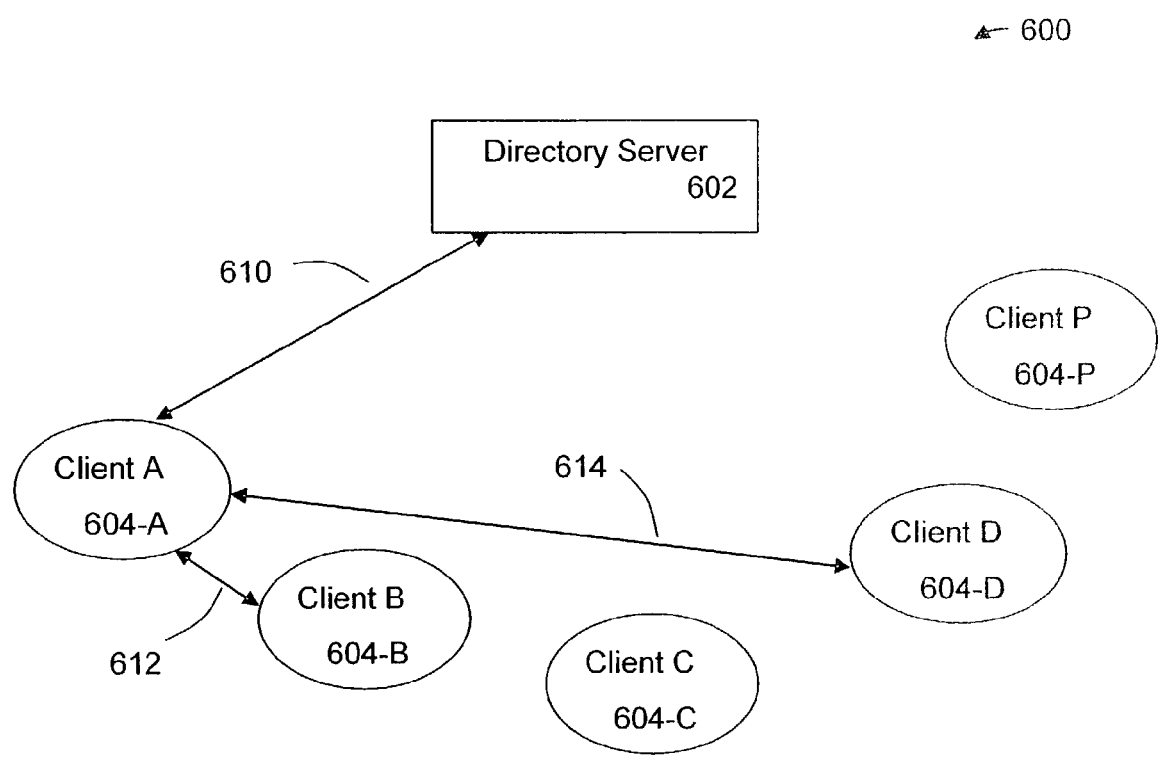
FIG. 6 illustrates one embodiment of the disclosed system being used for distributed backup and storage.

FIG. 6 illustrates one embodiment 600 of the disclosed system being used for distributed backup and storage. Client A 604-A communicates with directory server 602 via link 610 a request to store a local file which is located on Client A 604-A on another client or clients. Directory server 602 informs Client A 604-A that Client B 604-B and Client D 604-D are nearest and have available storage. Client A 604-A then transfers the files or parts of the files to Client B 604-B via link 612. If more storage is needed and/or a distributed backup was requested, then Client A 604-A may transfer files via 614 to Client D 604-D. These transfers are peer-to-peer and may occur on a LAN. In this example, the client has initiated the backup request. In another embodiment of the disclosed system, the backup request may originate from the directory server 604 and/or may originate from a file server on a network.

As discussed above, the capability for shifting of content from one network to another allows for many capabilities. Reference has been made to clients, servers, WAN, LAN, peer-to-peer, etc. In many cases the benefit of peer-to-peer transfers occurs when the clients are "nearest" to each other. From a network viewpoint the "nearest" client for file sharing, transfer, etc. may not be the closest physically. From a network performance standpoint the "nearest" client may be that client and/or clients, that may transfer the information the fastest. Thus, all the above approaches for shifting traffic may benefit from such an analysis of the network. One such approach to generating the "nearest" client information may use router table analysis.

Figure 7:
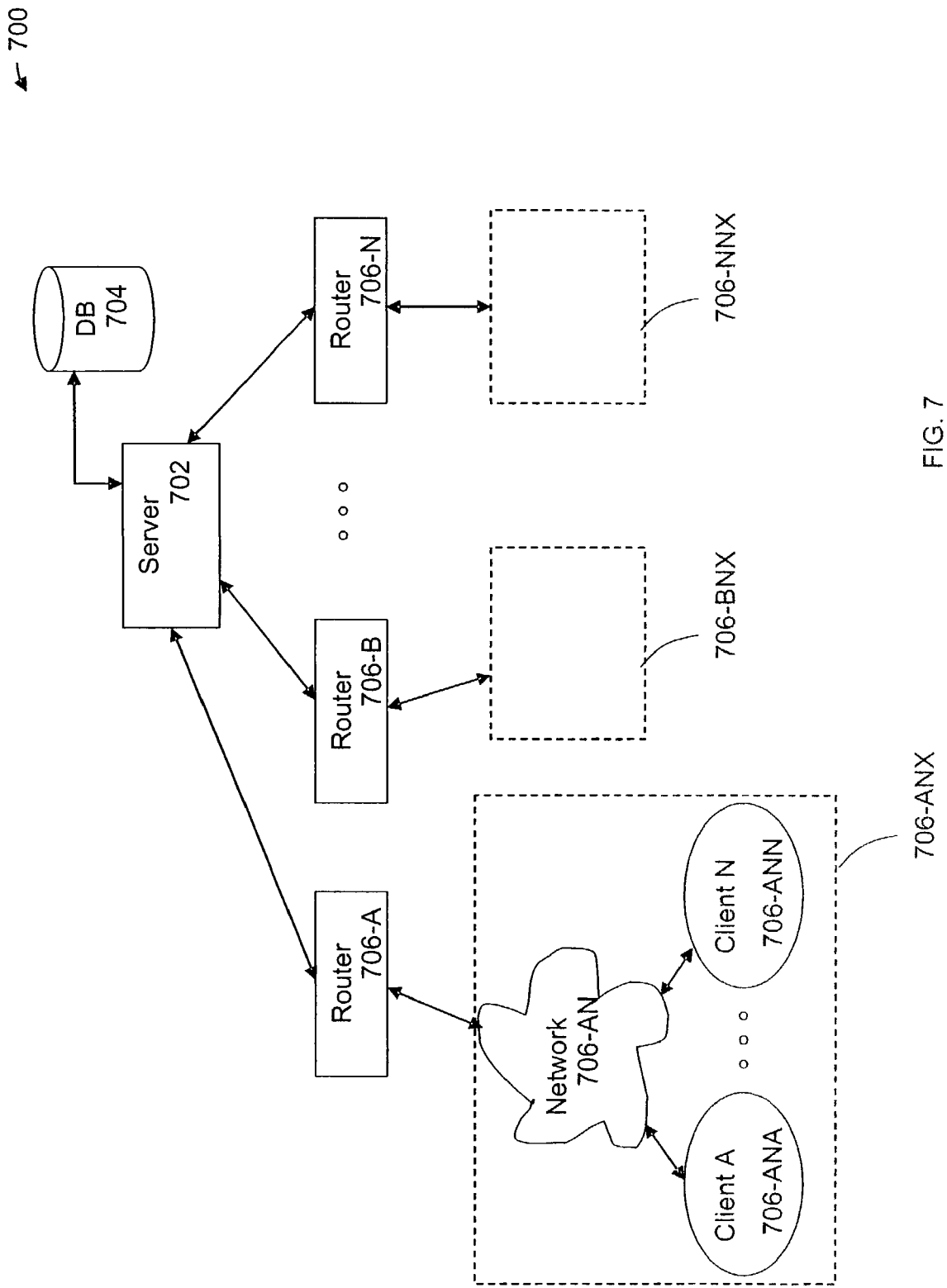
FIG. 7 illustrates one embodiment of the disclosed system using router table analysis for a network.

FIG. 7 illustrates one embodiment 700 of the disclosed system using router table analysis for a network. Server 702 is connected to routers 706-A through 706-N. Each router (706-A through 706-N) is connected to a respective group 706-ANX through 706-NNX. Each group (706-ANX through 706-NNX) includes a Network 706-AN through 706-NN respectively and respective Clients A through N. Database 704 is connected to the server 702. During operation, the server and router traffic is monitored to determine transfer times of files. This information is analyzed and stored in database 704. In one embodiment of the disclosed system, the database 704 would maintain a prioritized list of closest clients for a particular file. This database 704 information may then be accessed by a directory server to determine how to re-route and/or redirect traffic so as to effect the fastest peer-to-peer transfer between clients.

Thus, what has been described are embodiments of the disclosed system for use in such areas as file sharing, redirected data transfers, third party control of transfers, distributed backup and storage, and router table analysis.

In one embodiment, a peer-to-peer file database may be established to track the transfer of files from particular websites. If a website provider wanted to make use of this service they would run an application which would catalogue and index all files available from their site, uniquely identify them, and record a reference to them in the peer-to-peer database. Any subsequent transfers of these files would be tracked by the proxy service. A client based web proxy would reside on the client PC and run as a service. The proxy service would intercept all HTTP requests from the client and enable communication between the client and the peer-to-peer file database. When the user requests a file over HTTP, the proxy service would query the peer-to-peer database to see if it was tracking the location of this file. If the file was not being tracked, the request would proceed to the web server as per normal, and nothing unusual would happen. However, if the file was one of those being tracked by the system, the proxy service would query the peer-to-peer database for the nearest location of this file (usually on another user's PC) and retrieve the file directly from there, preferably on its own local network. This may have the benefit of reducing the download time for the user (if the file is greater than a certain size), and for the IT department by reducing the utilization on its Wide Area Network.

Figure 8:
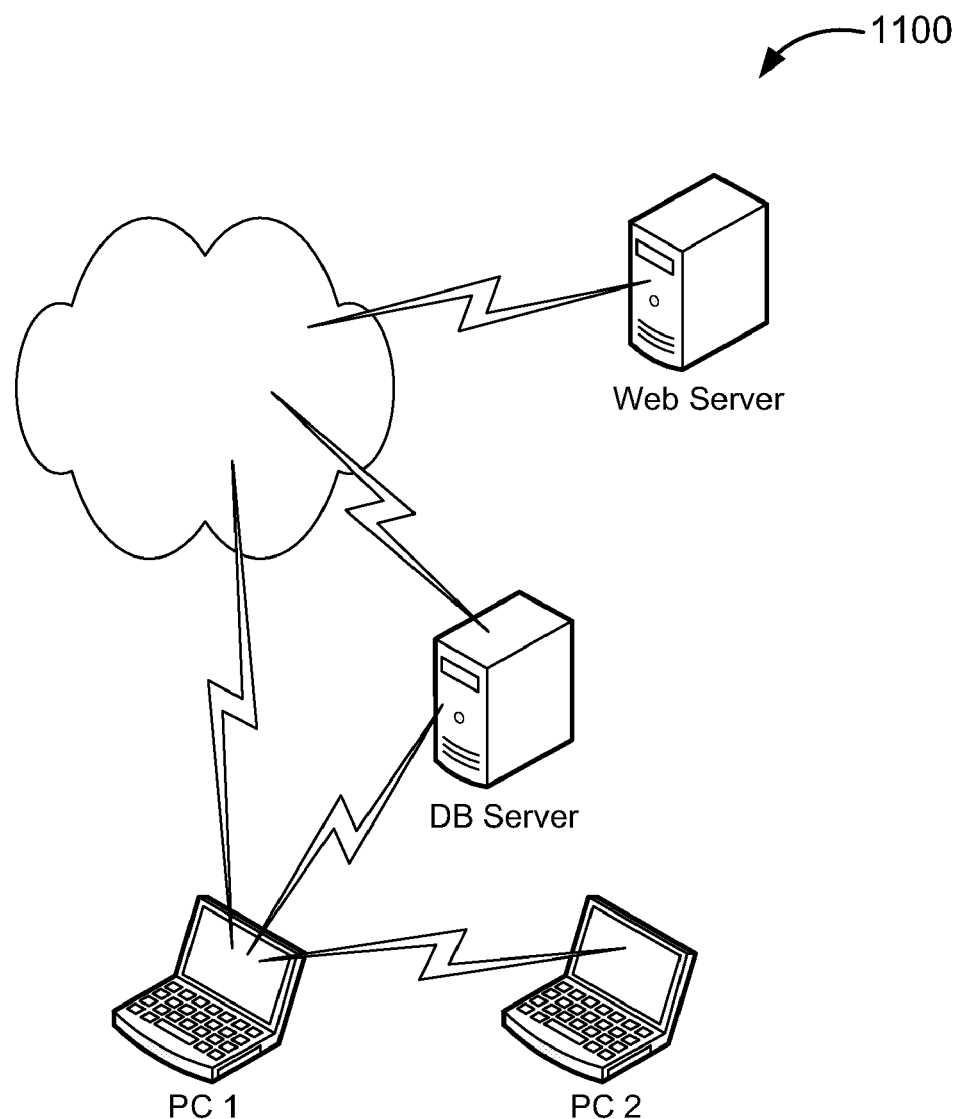
FIG. 8 illustrates one embodiment of the disclosed system for a peer-to-peer service.

Such an embodiment is illustrated in FIG. 8 where client PC 1 may request a file or website content from a webserver located on the Internet or Intranet. The request would be intercepted by a proxy service running on the client. The proxy would query the database, to see if the website being accessed was one that was being tracked by the peer-to-peer database. If the site is one which is being tracked by the peer-to-peer database, the system will check to see if the file is available locally. If the file is available locally, the information as to the local sources for the file (e.g. PC 2) will be returned to the requesting client (e.g., PC 1), and a direct file copy between the peers (e.g., PC1 and PC2) can be initiated from there. After this transfer, the peer-to-peer database will be updated to reflect that a new location for the file is available. If a copy of the file is not available locally, a standard request will be sent to the webserver hosting the file and a copy of it will be downloaded to the requesting client. As in the previous case, an update will be sent by the proxy service to the database, indicating that the file is now available locally, and making it available for future requests. If the website is not being tracked by the system, the proxy service will pass on the request to the webserver in the normal fashion with no impact to the user.

Figure 9:
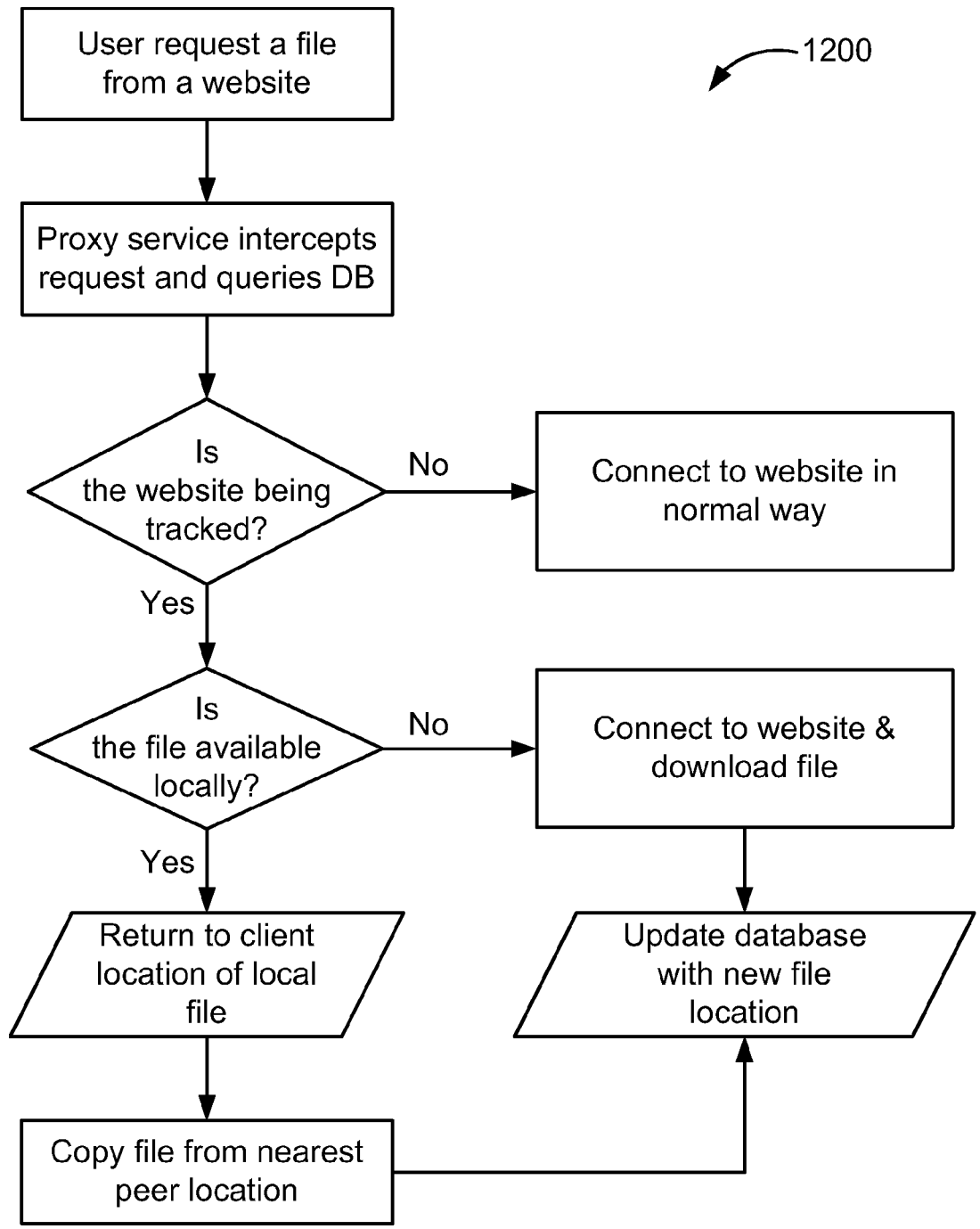
FIG. 9 is a flow chart of one embodiment of the disclosed system as a peer-to-peer service.

FIG. 9 illustrates a flow chart of one embodiment of the disclosed system. A proxy service would be deployed on client PCs which would intercept all HTTP requests between an Internet browser and any website. The proxy would query a peer-to-peer database to see if the website being requested was being tracked by the peer-to-peer system. If the site was being tracked, a list of locally available copies of the file would be returned to the client via the proxy service and a direct copy of the file from its nearest available peer would be initiated. This has the benefit of reducing the download time for the user for large files across the WAN and the Internet. Once the file has been copied, the database would be updated with a new location for the file. If the file is not available locally, it can be downloaded in the normal fashion from the target website, and once more upon completion, the database server would be updated to reflect a new location of the file on the local network. If the website was not being tracked, the request travels straight through the proxy and data is transferred without any intervention.

The proxy service acts as an intermediary for all traffic being requested over HTTP by the user. It queries the peer-to-peer tracking database for specific filenames and URLs. If filenames are found in the database, the request for the file is essentially redirected to the local copy. This reduces the download time for the user and minimizes the impact to available bandwidth.

From a practical implementation standpoint, for the system to be effective, a number of conditions may have to be applied at the proxy level. A minimum size may have to be specified for the file being downloaded. If the file is below a certain size, it may take longer to query the database and retrieve the file locally than it would to get the file directly. Another condition may be on the types of files available in this fashion. Also, an expiry time on the content may be applied to ensure that the user retrieves a new version of the file being requested if one is available.

Figure 10:
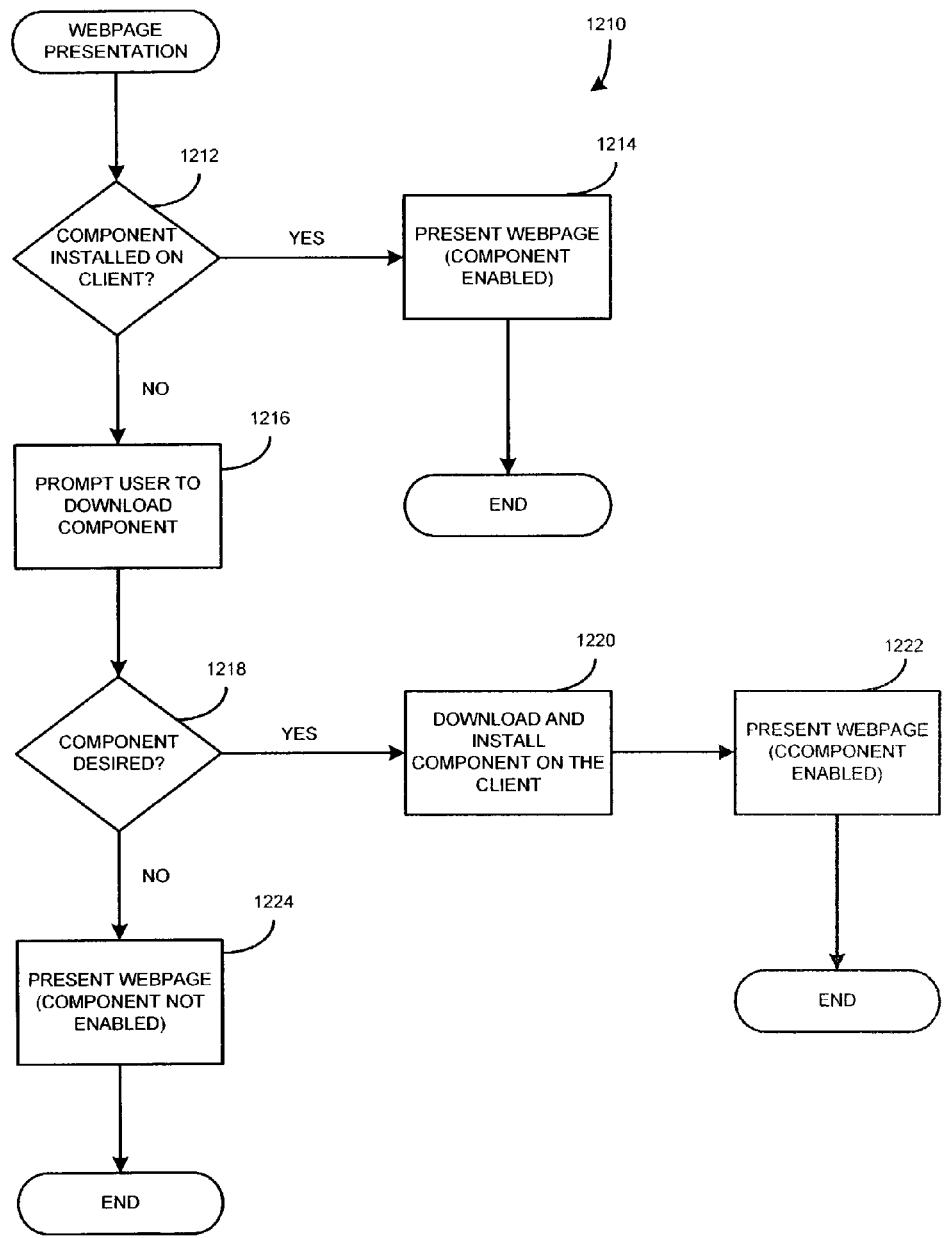
FIG. 10 is a flow chart of one embodiment of a webpage presentation process.
Figure 11:
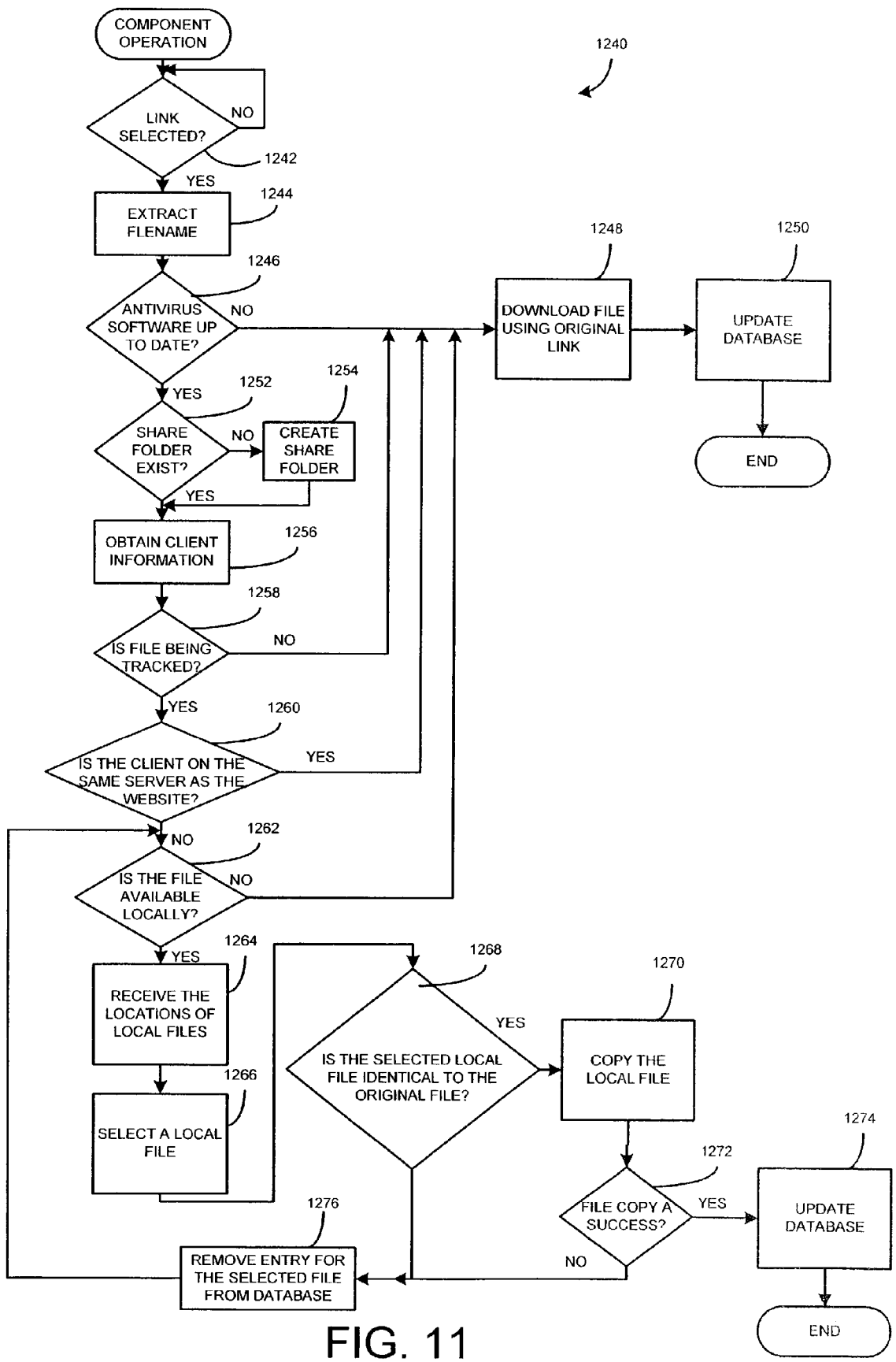
FIG. 11 is a flow chart of one embodiment of a component operation process.

In contrast to previously described embodiments that operate as proxy services, an alternative embodiment, as shown in FIGS. 10-11, includes a component on a client (e.g., PC 1 of FIG. 8) that intercepts a file request between an Internet browser and any website enabled to operate with the client. While the foregoing and the following refer to files being transferred, those having ordinary skill in the relevant art will readily recognize that any kind of data can be transferred and that the disclosed system is not limited only to handling files. For example, the disclosed system could handle data in the form of files, streaming data or any other form of closed or open-ended data source. Once intercepted from the browser, the file request is checked against a database to determine if the requested file is available locally via a peer-to-peer exchange. If the file is available locally, the client is redirected to download the information from the local source via peer-to-peer communication techniques.

The embodiment described in conjunction with FIGS. 10 and 11 is similar to the embodiment described in conjunction with FIGS. 8 and 9. However, as described in detail below, the embodiment of FIGS. 10 and 11 differs from the embodiment of FIGS. 8 and 9 in that operation of the client component is driven by the link to the requested file. In general, if the link (e.g., the URL) to the requested file includes an indicator such as, for example, an on-click conditional event or any other conditional event appended thereto, the component will be activated upon selection of the link through the use of an Internet browser. The on-click event may be, for example, a file transport protocol (FTP) file copy on-click event, a user datagram protocol (UDP) file copy on-click event or a hypertext transport protocol (HTTP) file copy on-click event. The embodiment described in connection with FIGS. 10 and 11 generally includes two portions: a webpage presentation portion (see FIG. 10) and a component operation portion (see FIG. 11). Each of these portions is described in detail below.

FIG. 10 illustrates a webpage presentation process 1210. When a user directs his browser to display a particular webpage of information, the browser reads, from a file, information defining the look and behavior of that webpage. When a webpage designer desires a particular webpage to include information that may be distributed via a peer-to-peer process, the webpage designer embeds in the information defining the webpage a reference to a location of a component, such as an ActiveX component. FIG. 10 illustrates a process 1210 that is executed when a browser reads webpage information including a reference to the component. If a particular webpage does not include a reference to the component, the links on that webpage will be downloaded in a conventional manner when the links are selected.

The component, as described in detail below, is the entity responsible for determining, in concert with a database, if a particular desired file is available locally in a peer-to-peer manner. When the component is enabled, a peer-to-peer redirection of a request is possible and when the component is disabled, a peer-to-peer redirection of the request is not possible. The selective enabling and disabling of the component enables a web content provider to require browsers always to obtain webpage information from the content provider and also allows the content provider to enable browsers to redirect requests to other information sources. One factor affecting a web content provider's decision to redirect or not to redirect may be the frequency with which the web content provider changes his content.

In particular, as shown in the webpage presentation process 1210, the browser determines if the component is installed on the client on which the browser is operating (block 1212). If the component is installed on the client, the webpage is presented on the browser and the component is enabled (block 1214). Alternatively, if the component is not installed on the client (block 1212), the client prompts the user to download the component (block 1216). The client may prompt the user to download the component through the use of an on-screen display, such as a pop up box or menu to which the user must respond. If the user desires the component (block 1218), the client downloads and installs the component on the browser of the client (block 1220). After the component is installed on the client (block 1220), the webpage is presented to the user on the browser with the component enabled (block 1222). If, however, the component is not desired (block 1218), the webpage is presented without the component being enabled (block 1224).

Once the component is operational and enabled, the component operates in a manner that is described below in conjunction with FIG. 11, which illustrates a component operation process 1240. During operation, the component monitors the operation of the webpage for the occurrence of a link selection (block 1242). On example of a link selection is an on-click event, which, as will be readily appreciated by those having ordinary skill in the art, is an event that occurs when a user, via his browser, selects a hyperlink having an on-click event appended thereto. Accordingly, for the component to allow redirection of download from a first location to a second, and peer-to-peer location, the link corresponding to the desired file must have an on-click event or another similar event appended thereto.

As long as an on-click event is not detected, the operation of the component remains at block 1242. Accordingly, numerous links not having events associated therewith may be selected and thus associated content may be provided to a user without the process 1240 leaving block 1242. However, if an on-click event is detected (block 1242), a filename of a golden file associated with the link is extracted from the link (block 1244). As used herein, the term golden file is used to indicate an original file as stored on a server, copies of which may be stored at client locations. The copies of the golden file are not referred to herein as being golden files themselves. If the antivirus software running on the client is not up to date (block 1246), the golden file associated with the link will be downloaded using the original link (block 1248). For example, referring again to FIG. 8, the client PC 1 will download the golden file directly from the webserver and will not locally redirect to a peer, e.g., PC 2. After the golden file is downloaded using the original link (block 1248), the component of the client corresponds with the database (e.g., the database server of FIG. 8) to inform the database that a copy of the golden file is resident on the client that just downloaded a copy of the golden file (block 1250).

Alternatively, if the component determines that the antivirus software is up to date (block 1246), the component then determines if a share folder exists on the client (block 1252). A share folder is a folder resident on a client in which information to be shared in a peer-to-peer manner is located. If a share folder does not exist, a share folder is created (block 1254). If either a share folder exists (as determined by block 1252) or a share folder has been created (block 1254), client information is obtained by the component (block 1256). Client information may include the Internet protocol (IP) address of the client or any other suitable piece of information that identifies the client. If the client determines that the golden file is not being tracked by the database (block 1258), a copy of the golden file is downloaded using the original link and the database is updated to reflect the fact that a copy of the golden file has been downloaded to the client (blocks 1248 and 1250).

If the client determines that the golden file is being tracked (block 1258), the client determines if the client is on the same server as the website from which the golden file is to be downloaded (block 1260). If the client and the website are on the same server, no significant efficiency gain will be realized by attempting to locate a peer having a copy of the golden file. Accordingly, the client downloads a copy of the golden file using the original link and the database is updated to reflect the download of a copy of the golden file to the client (blocks 1248 and 1250).

Alternatively, if the client is not on the same server as the website or the golden file (block 1260), the component determines if the file is available locally (block 1262). The component determines if the file is available locally by querying the database to see if there is an entry corresponding to the golden file name. Such an entry could be made as described in connection with block 1250. If the file is not available locally, the file is downloaded and the database is updated (blocks 1248 and 1250). If, however, a copy of the golden file is available locally (e.g., there is a database entry corresponding to the golden file path), the component receives from the database the location(s0 of the local cop(ies) of the files (block 1264). For example, the database may provide to the client a list of IP addresses corresponding to one or more clients having a copy of the golden file stored thereon. The clients located at the IP addresses specified by the database are candidates from which the client running the component may obtain a copy of the golden file through peer-to-peer communication techniques.

After the component has received a list of clients having the desired file stored thereon, the component selects a particular local file copy from one of the clients specified by the database (block 1266). The particular local file copy may be selected by, for example, determining which client having the file stored thereon is located near the client seeking the file, historical or current usage information, network conditions, or by any other technique for determining priority. Once a particular file has been selected (block 1266), the component determines if the selected file is identical to the golden file on the server specified by the link (block 1268). The test for identity may be carried out by brute force comparison between the locally-stored file and the golden file, a comparison between the timestamps of the local and golden files or by a checksum or hash comparison between the files. In the alternative, a server of a golden document could notify the database when the golden document is modified so that the database could eliminate the indication that the database had links to local copies of the golden file, because all local files were not the latest version of the golden file.

If the local copy of the golden file matches the golden file specified by the link selected by the user (block 1268), the component copies the local file from the client (e.g., PC 2 of FIG. 8) in a peer-to-peer manner (block 1270). The local file is copied in portions, which allows the component to resume copying with subsequent portions if copying is interrupted due to a lost connection. When copying is complete, the component copies the file from the directory specified by the user to the shared folder resident on the client. If the download of a copy of the golden file from the selected client is successful (block 1272), the database is updated to reflect that the client now includes a copy of the golden file (block 1274).

If the local file is not identical to the golden, or original, file, or if copying the golden file from another client via peer-to-peer is not successful, the component instructs the database to remove the entry for the selected local location (block 1276). This prevents the database from specifying that a particular client stores a copy of the golden file, when in reality that particular client does not have such a copy. After the entry is removed from the database (block 1276), the component determines if a copy of the golden file is locally available. This time, however, the list of locations that is returned does not include the previous location that either included a file that was not a true copy of the golden file (as determined at block 1268) or from which the complete copy of the golden file was not obtained (as determined at block 1272).

In yet another embodiment of the disclosed system, a client which is intermittently connected to a network (e.g. a handheld PC) can select a file for download from a remote location (slow WAN connection) using a peer-to-peer application. The user may then request that the file be downloaded to another client which is permanently connected to the network, e.g. a desktop PC, at a location near the handheld PC (fast LAN connection). The next time they connect they can download the file from the nearby client over the fast connection in a fraction of the time. This service may be controlled by a directory server and a peer-to-peer application or an agent which may be installed on PCs and the handheld devices.

Figure 12:
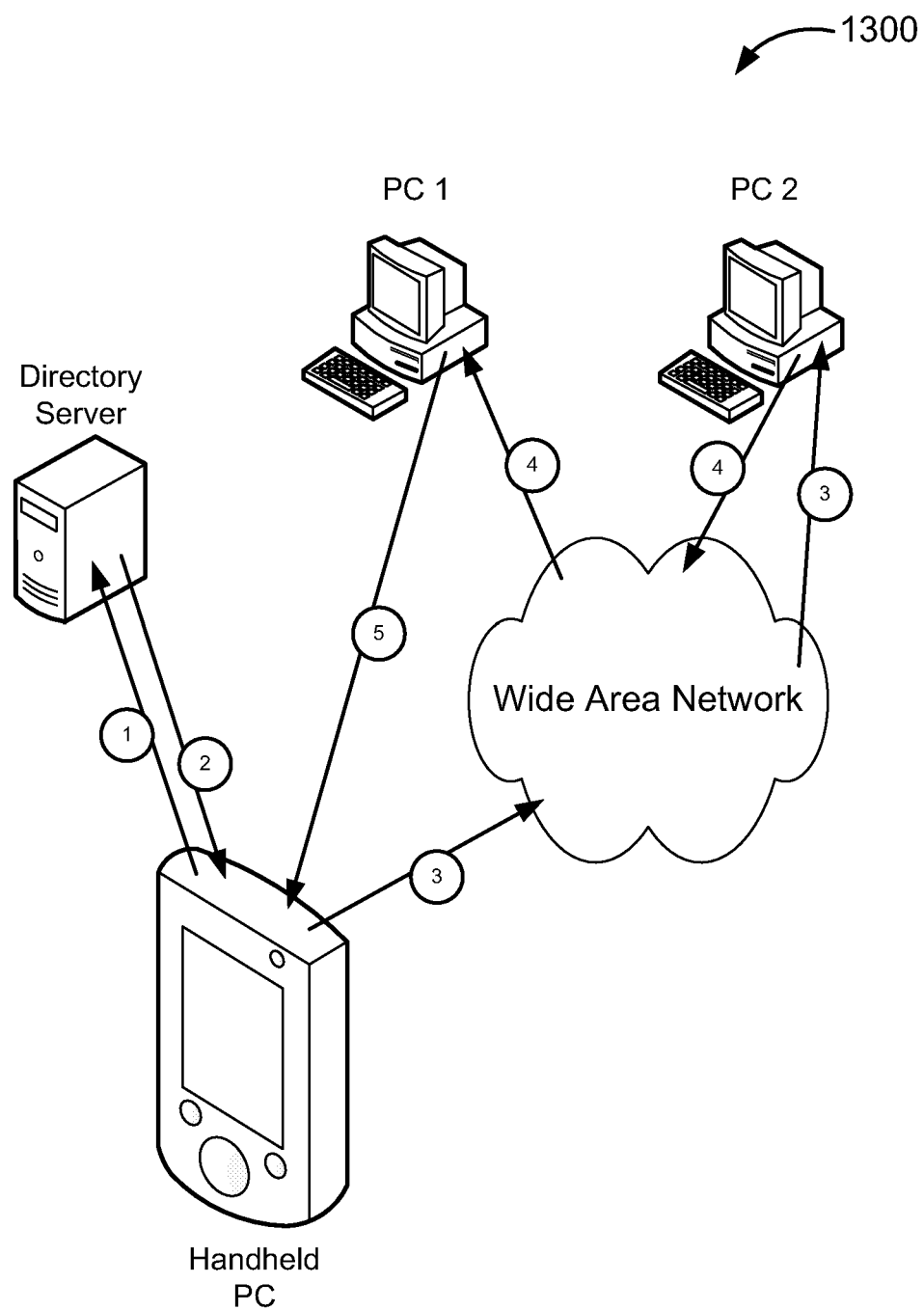
FIG. 12 illustrates one embodiment of the disclosed system where a third party is controlling a file transfer.

FIG. 12 illustrates one such embodiment of the disclosed system. The handheld PC selects a file using a peer-to-peer application and queries a directory server for its location (communication 1). The directory server answers the request with the file being located on PC2 (communication 2). Since PC2 is across a Wide Area Network, it may take a long time to download the file, so the handheld may PC request that the file be copied to PC1 (communication 3), thereby allowing the handheld PC to disconnect from the network. PC2 then copies the file to PC1 over the Wide Area Network (communication 4). When the handheld PC rejoins the network, the file can be copied quickly from PC1 (communication 5).

In another embodiment of the disclosed system, it may be used for distributed backup and storage using peer-to-peer technology. This involves the usage of a portion of disk space from a number of computers on a network and using them to form a logical or virtual drive made up of an array of disks. This may also be linked with a methodology such as RAID (Redundant Array of Inexpensive Disks) to allow for any content stored across this drive to be restored when a certain number of the disks (but not necessarily all) are online. This may be used for backing up data to client PCs and restoring as necessary. Another approach would be to backup a complete dataset to a statistically sound number of PCs ensuring that files may be restored a certain high percentage of the time.

A portion of users' hard disk space would be reserved by an administrator for this purpose and it may or may not be visible to the user on that PC. In addition, all data stored may be encrypted to maintain the security and privacy of the owner's data. The backing up of files may be mediated by a server. This server would track available clients and the location of files that have been backed up, in addition to controlling the security of the system.

Figure 13:
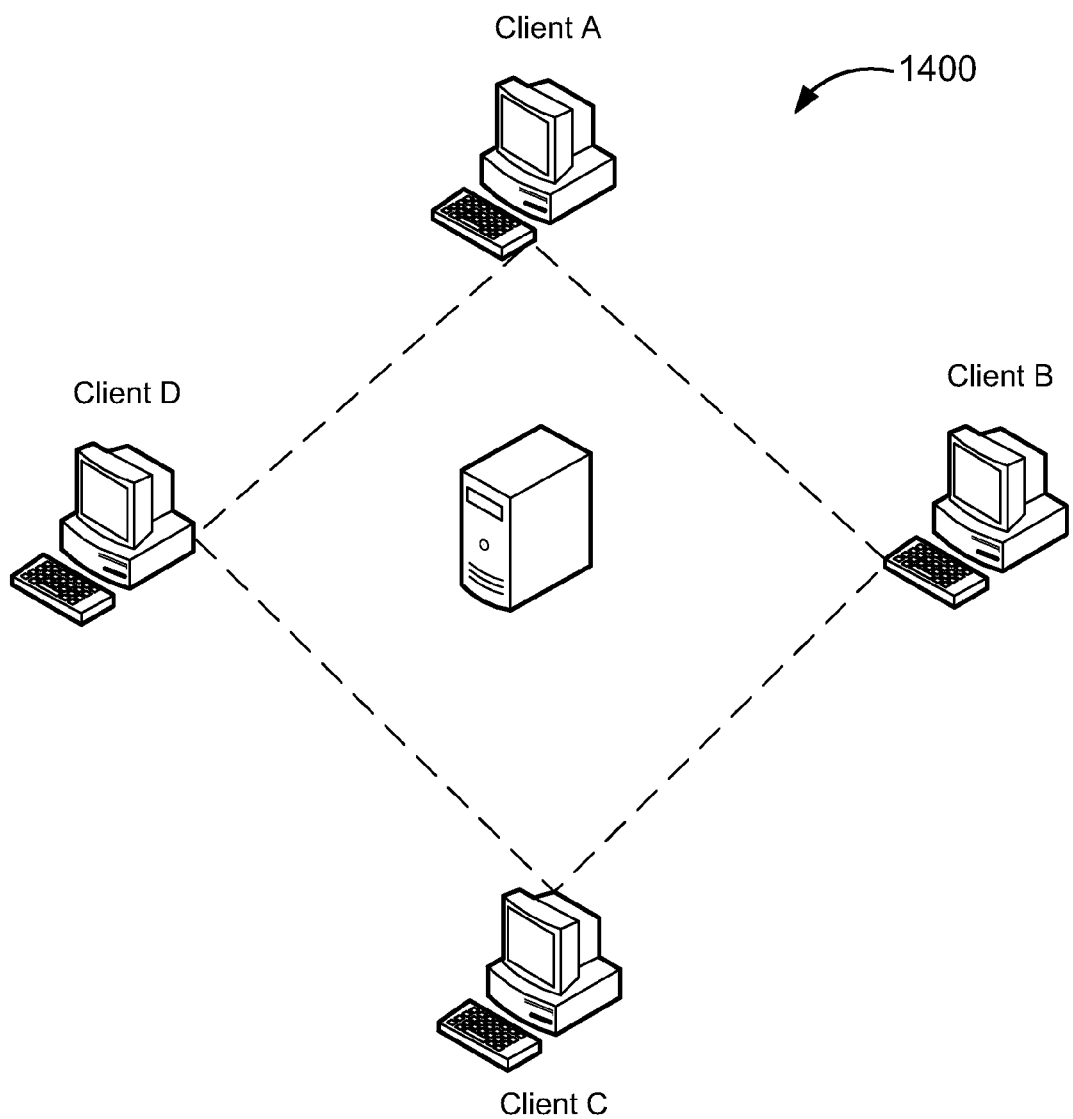
FIG. 13 illustrates one embodiment of the disclosed system for backup storage.

FIG. 13 illustrates one such embodiment of the disclosed system. Client A could decide to backup a number of files. Instead of going to a fileserver, an agent application on client A's PC would query the server in the peer-to-peer network. This server would identify a number of other PCs to backup the data to—in this example, Clients B, C & D. One of two things would then happen—either the complete files would be copied in turn to Clients B, C & D or parts of the files may be copied to Clients B, C & D using, for example, a RAID algorithm.

In yet another embodiment of the disclosed system, an agent program may be deployed on a client PC which would monitor the user's files which have changed. The, at a predefined interval this agent would connect to the central control server to determine what peer PCs the files should be backed-up to. Once determined, the agent may initiate a file copy to each of the identified peers, either carrying out a complete copy of the files to each of the peers or a copy determined by a RAID algorithm, etc. In addition, only the parts of the files that have changed or new files added to the system may get backed up. To restore files, the agent may once again connect to the central control server to determine the location of the files to be restored and initiate the transfer back.

In another embodiment, the disclosed system may be used to speed up peer-to-peer transfers. In a peer-to-peer network, data is transferred between clients instead of from a server to a client. At present, many peer-to-peer applications operate by using predefined routes across a network to transfer date from one place to the other. Theoretically this method will result in the fastest download times for the user; however it does not take into account delays which may be caused by network congestion or outages. By implementing a system of collecting information from routers, the paths through a network are more dynamic and up-to-date. A peer-to-peer software application would be able to leverage this information if it was stored in a manner which was readily accessible to it, such as a database. When a user would select a file for download, the peer-to-peer application would query the database in its normal manner for the available copies of a file. In addition, it would now query a database for the best paths to these files, ruling out ones which were inaccessible, due to outages and congestion for example, and ordering the list of available copies in terms of shortest download times. This reduces the time to access content for the user and also minimizes the impact on various segments of the network.

To gain the most efficient transfer of data, files should be copied from the nearest available client that has the information which is being requested. While a peer-to-peer system may know the location of the nearest available client, this machine is not always necessarily the one from where the fastest data transfer may occur. This may be due to network congestion or other problems on the network. In general, a network router will be aware of impacts like this on the network and route general data transfers using a more appropriate path. This information is stored in router tables and is updated frequently through broadcasts that are sent around the network.

An embodiment of the disclosed system in the form of a software application may run on a server and proactively listen on the network for update broadcasts between network routers. The application would interpret these broadcasts and store the information in tables located on a network accessible database. This information may then be obtained and used by a peer-to-peer application by issuing a query to the database to determine the most appropriate path to begin copying information from.

Figure 14:
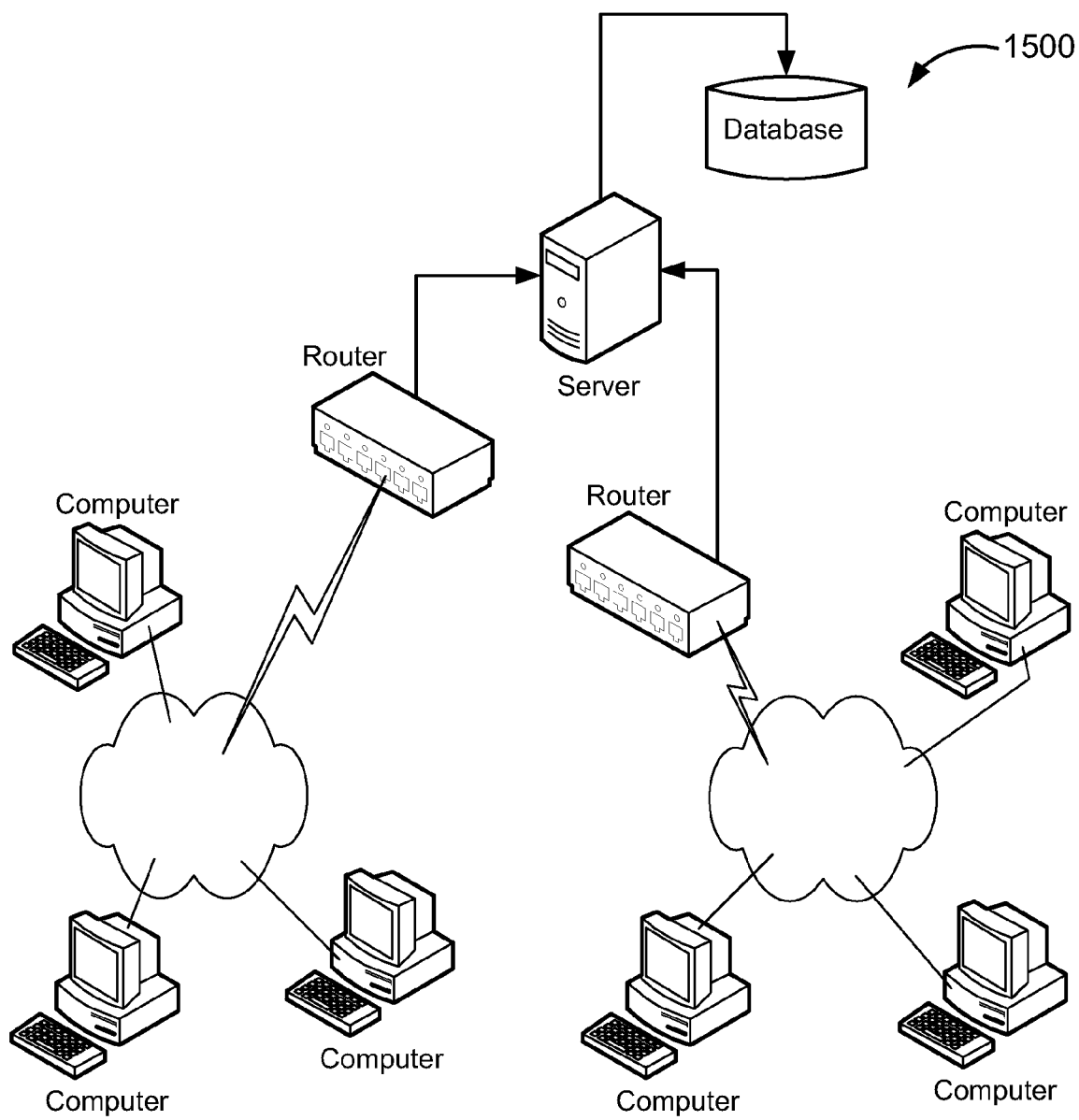
FIG. 14 illustrates one embodiment of the disclosed system for router table analysis.

FIG. 14 illustrates one such embodiment of the disclosed system. The server would listen on the network for update broadcasts between, in this example, the two routers, to get information on the most appropriate paths through the system. This information is analyzed and interpreted by the application and uploaded to the database where it is available for interrogation by a peer-to-peer application. The peer-to-peer application may be running on any of the computers shown in FIG. 14. During operation the application would query its database for the nearest copy of a file and then query the router information stored in the database for the best path to the data sources. Using these two points of reference, an ordered list of content, which will be the fastest to retrieve, would be returned to the application thus minimizing the impact on the network and delivering the file as quickly as possible to the user. Since the routers are continually being updated, the most appropriate path to take through the network will be known from listening to the broadcasts.

In another embodiment, a software application would be deployed on a server which would listen to broadcasts on the network between the routers deployed on it as well as network traffic. The information gathered would give details on the best path to take if someone was copying information, from one client to another on a different part of the network. The application would interpret the broadcasts and traffic, and this information would be stored in database tables which may be interrogated by a software application. The information in the database would be updated by the software listening to further broadcasts and traffic, and inserting the data when appropriate, ensuring that it was current and up to date.

Thus, various other embodiments of the disclosed system have been described.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), wireless network, satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of communicating means or device whether local or remote, such as a LAN, a WAN, a system bus, etc.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, a Cathode Ray Tube (CRT), Liquid Crystal Display (LCD), a projection system, Television (TV), etc. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the disclosed system, it is to be understood that various terms are used by those knowledgeable in the art to describe techniques and approaches. Furthermore, in the description, for purposes of explanation, numerous specific details are set forth in order to provide a thorough understanding of the disclosed system. It will be evident, however, to one of ordinary skill in the art that the disclosed system may be practiced without these specific details. In some instances, well-known structures and devices are shown in block diagram form, rather than in detail, in order to avoid obscuring the disclosed system. These embodiments are described in sufficient detail to enable those of ordinary skill in the art to practice the disclosed system, and it is to be understood that other embodiments may be utilized and that logical, mechanical, electrical, and other changes may be made without departing from the scope of the disclosed system.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The disclosed system can be implemented by an apparatus for performing the operations herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the disclosed system can be implemented in hard-wired circuitry, by programming a general-purpose processor, or by any combination of hardware and software. One of ordinary skill in the art will immediately appreciate that the disclosed system can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The disclosed system can also be practiced in distributed computing environments where tasks are performed by remote processing devices that are linked through a communications network.

The methods of the disclosed system may be implemented using computer software. If written in a programming language conforming to a recognized standard, sequences of instructions designed to implement the methods can be compiled for execution on a variety of hardware platforms and for interface to a variety of operating systems. It will be appreciated that a variety of programming languages may be used to implement the teachings of the disclosed system as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the disclosed system may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Reference has been made to LAN (Local Area Network) and WAN (Wide Area Network). What is to be understood, as is understood by those of ordinary skill in the art, is that LAN and WAN are relative terms. For example, the Internet may be considered a WAN with respect to a large corporate network, and the large corporate network may be considered a WAN with respect to a department network within the large corporation network. Likewise, the small department network may be considered a LAN with respect to a large corporate network, and the large corporate network may be considered a LAN when compared to the Internet. As such, what one is to appreciate, is that where discussions have related LANs to WANs, they are relating smaller networks to larger networks, and that this comparison is not fixed as to where the comparison takes place. Thus, one network may appear as a WAN to a smaller network, and yet to another network appear as a LAN. What is to be appreciated is that in the art, the words sometimes have meanings commensurate with the surrounding environment, and yet often the words are used interchangeably without respect to the specific structure or environment, i.e. one of ordinary skill in the art understands the use and meaning.

Thus, a method and apparatus for peer-to-peer services have been described.

What is claimed is:

1. A method of downloading information to a client through a network, the method comprising:
    presenting a link pointing to data that resides at a first location represented by the link;
    receiving an indication that the link has been selected by the client;
    receiving a representation of the first location;
    receiving an indication that the client is disconnected from the network in response to a disconnection of the client from the network;
    determining if a second location stores a copy of the data stored at the first location;
    receiving a representation of the second location if the copy is stored in the second location;
    requesting, via the client, download of the data from the first location to the second location if the copy is not stored in the second location; and
    in response to receiving an indication that the client is reconnected to the network, requesting download of the copy from the second location to the client.

2. The method as defined by claim 1, wherein the data comprises a file.

3. The method as defined by claim 1, wherein the data comprises streaming data.

4. The method as defined in claim 1, wherein the link is presented at the client as a portion of a webpage.

5. The method as defined in claim 1, wherein receiving the indication that the link has been selected comprises an on-click event.

6. The method as defined in claim 5, wherein the on-click event comprises a transport protocol copy on-click event.

7. The method as defined in claim 5, wherein the on-click event comprises a user datagram protocol copy on-click event.

8. The method as defined in claim 5, wherein the on-click event comprises a hypertext transport protocol copy on-click event.

9. The method as defined in claim 1, further comprising intercepting a request by the client for transfer of the data from the first location to the client.

10. The method as defined in claim 1, wherein determining if the second location stores the copy of the data stored in the first location comprises accessing a database storing a list of data and a list of locations at which each portion of data in the list of data is stored.

11. The method as defined in claim 10, further comprising updating the database after the data is downloaded from at least one of the first location or the second location to the client.

12. The method as defined in claim 1, further comprising, if the client is on a same network site as the first location, commencing download of the data from the first location even if the copy is available at the second location.

13. The method as defined in claim 1, wherein the client is a first client and wherein the second location comprises a second client.

14. The method as defined in claim 13, wherein requesting download of the copy from the second location comprises peer-to-peer communication.

15. A computer readable storage medium storing machine readable instructions that, when executed, cause an apparatus to:
    present at a client a link pointing to data that resides at a first location represented by the link;

recognize that the link has been selected by the client;
receive a representation of the first location;
receive an indication that the client is disconnected from the network in response to a disconnection of the client from the network;
determine if a second location stores a copy of the data stored at the first location;
receive a representation of the second location if the copy is stored in the second location;
request, via the client, download of the data from the first location to the second location if the copy is not stored in the second location; and
in response to receiving an indication that the client is reconnected to the network, request download of the copy from the second location to the client.

16. The machine accessible medium as defined by claim 15, wherein the data comprises a file.

17. The machine accessible medium as defined by claim 15, wherein the data comprises streaming data.

18. The machine accessible medium as defined in claim 15, wherein the instructions are further structured to cause the apparatus to present the link as a portion of a webpage.

19. The machine accessible medium as defined in claim 15, wherein the instructions are fun her structured to cause the apparatus to receive the indication that the link has been selected as an on-click event.

20. The machine accessible medium as defined in claim 19, wherein the on-click event comprises a transport protocol copy on-click event.

21. The machine accessible medium as defined in claim 19, wherein the on-click event comprises a user datagram protocol copy on-click event.

22. The machine accessible medium as defined in claim 19, wherein the on-click event comprises a hypertext transport protocol copy on-click event.

23. The machine accessible medium as defined in claim 15, wherein the instructions are further structured to cause the apparatus to intercept a request by the client for transfer of the data from the first location to the client.

24. The machine accessible medium as defined in claim 15, wherein the instructions are further structured to cause the apparatus to access a database storing a list of data and a list of locations at which each portion of data of the list of data is stored.

25. The machine accessible medium as defined in claim 24, wherein the instructions are farther structured to cause the apparatus to update the database after the data is downloaded from at least one of the first location or the second location to the client.

26. The machine accessible medium as defined in claim 15, wherein the instructions are further structured such that, if the client is on a same network site as the first location, to cause the apparatus to commence download of the data from the first location even if the copy is available at the second location.

27. The machine accessible medium as defined in claim 15, wherein the client is a first client and wherein the second location comprises a second client.

28. The machine accessible medium as defined in claim 27, wherein requesting download of the copy from the second location comprises peer-to-peer communication.

29. A download system adapted to download information to a client from at least one of a first or a second information source, the system comprising:
a processing unit configured as a client and communicatively connected to the second information source;
a user interface adapted to present a link pointing to data stored at a first information source address represented by the link and to generate in response to a user input an indication that the link has been selected;
a download component adapted to, when executed, operate on the client to cause the client to:
receive the indication that the link has been selected by the client;
receive a representation of the first information source address;
receive an indication that the client is disconnected from the second information source in response to a disconnection of the client from the network;
determine if the second information source stores a copy of the data stored at the first information source address;
receive a representation of a second information source address if the copy is stored in the second information source;
request, via the client, download of the data from the first information source to the second information source if the copy is not stored in the second information source; and
in response to receiving an indication that the client is reconnected to the second information source, request download of the copy from the second information source to the client.

30. The system as defined by claim 29, wherein the data comprises a file.

31. The system as defined by claim 29, wherein the data comprises streaming data.

32. The system as defined in claim 29, wherein the link is presented by the user interface as a portion of a webpage.

33. The system as defined in claim 29, wherein the download component receives the indication that the link has been selected as an on-click event.

34. The system as defined in claim 33, wherein the on-click event comprises a transport protocol copy on-click event.

35. The system as defined in claim 33, wherein the on-click event comprises a user datagram protocol copy on-click event.

36. The system as defined in claim 33, wherein the on-click event comprises a hypertext transport protocol copy on-click event.

37. The system as defined in claim 29, wherein the download component receives the representation of the first location by intercepting a request by the client for transfer of the data from the first location to the client.

38. The system as defined in claim 29, wherein the download component determines if the second location stores the copy of the data stored in the first location by accessing a database storing a list of data and a list of locations at which each portion of data of the list of data is stored.

39. The system as defined in claim 38, wherein the download component updates the database after the data is downloaded from at least one of the first information source or the second information source to the client.

40. The system as defined in claim 29, wherein the download component determines if the client is on a same network site as the first information source and commences download of the data from the first information source even if the copy is available at the second information source.

41. The system as defined in claim 29, wherein the client is a first client and wherein the second information source comprises a second client.

42. The system as defined in claim 41, wherein requesting download of the copy from the second information source comprises peer-to-peer communication.

43. A method of transferring information to a client comprising:
- receiving a request from the client for the information, the request indicating a remote network location for the information;
- receiving an indication that the client is disconnected from a local network location in response to a disconnection of the client from the local network location;
- transferring the information from the remote network location to a second client on the local network location; and
- in response to receiving an indication that the client is reconnected to the local network, transferring the information from the second client to the client.

44. A method as defined in claim 43, wherein transferring the information from the second client to the client comprises a peer-to-peer communication.

45. A method as defined in claim 44, wherein the peer-to-peer communication operates on a local area network.

46. A method as defined in claim 43, wherein transferring the information from the remote network location to the second client comprises a transfer between a wide area network and a local area network, respectively.

47. A method as defined in claim 43, wherein the client comprises a portable computer.

48. A method as defined in claim 43, wherein transferring the information from the remote network location to the second client is performed in response to receiving the indication that the client is disconnected from the local network location.

* * * * *